(12) United States Patent
Moody

(10) Patent No.: US 6,936,339 B2
(45) Date of Patent: *Aug. 30, 2005

(54) CARBON COMPOSITES WITH SILICON BASED RESIN TO INHIBIT OXIDATION

(75) Inventor: Henry Moody, Winchester, CA (US)

(73) Assignee: Albany International Techniweave, Inc., Rochester, NH (US)

( * ) Notice: Subject to any disclaimer, the term of this patent is extended or adjusted under 35 U.S.C. 154(b) by 54 days.

This patent is subject to a terminal disclaimer.

(21) Appl. No.: 10/302,039

(22) Filed: Nov. 22, 2002

(65) Prior Publication Data

US 2003/0148081 A1 Aug. 7, 2003

Related U.S. Application Data

(62) Division of application No. 09/755,160, filed on Jan. 10, 2001, now Pat. No. 6,555,211.

(51) Int. Cl.⁷ .............................. B32B 3/06; B32B 5/26; B32B 9/00; B32B 27/04; D04H 13/00
(52) U.S. Cl. ....................... 428/218; 442/203; 442/205; 442/249; 442/414; 428/102; 428/119; 428/120; 428/547; 428/920; 428/921
(58) Field of Search ................................ 442/205, 203, 442/249, 414; 428/547, 610, 218, 920–921, 119–120, 102

(56) References Cited

U.S. PATENT DOCUMENTS

| 4,038,440 | A | * | 7/1977 | King | 442/205 |
| 5,071,700 | A | * | 12/1991 | Sugino et al. | 442/377 |
| 5,536,562 | A | * | 7/1996 | Tran et al. | 428/218 |
| 6,103,337 | A | * | 8/2000 | Burgess | 428/119 |
| 6,555,211 | B2 | * | 4/2003 | Moody | 428/218 |
| 6,638,883 | B2 | * | 10/2003 | Gaffney et al. | 442/181 |

OTHER PUBLICATIONS

"Between". The Concise Oxford Dictionary, 1995.*

* cited by examiner

Primary Examiner—Ula Ruddock
Assistant Examiner—Jennifer Boyd
(74) Attorney, Agent, or Firm—Frommer Lawrence & Haug LLP; Ronald R. Santucci

(57) ABSTRACT

A thermal protection system (TPM) for protecting a surface subject to high thermal load comprising a fiber substrate where the substrate is composed of woven or non-woven layers of fibers laminated together, or the substrate is formed by a process of three-dimensional weaving, wherein the fiber substrate has a variable density of fibers, with said density of fibers increasing across the thickness of the TPM, and further wherein the substrate is needled and coupled to an insulation backing.

11 Claims, 10 Drawing Sheets

Hybrid Layered Structure with Needling

Needling Principle

Jacquard woven multi-directional preform with built-in pore volume

FIG. 6
RTM of Partially Densified Carbon-Carbon
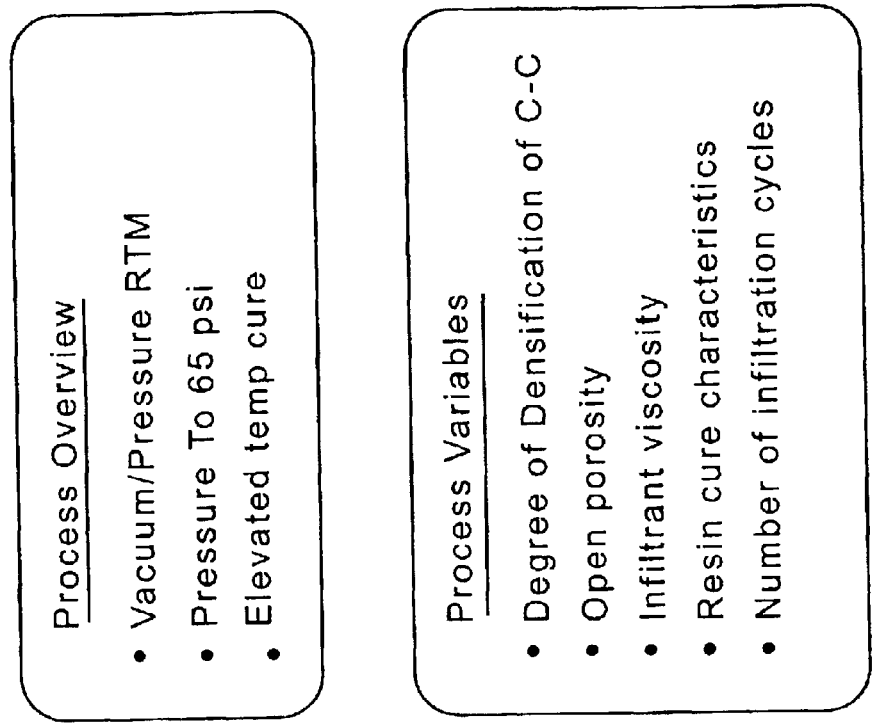
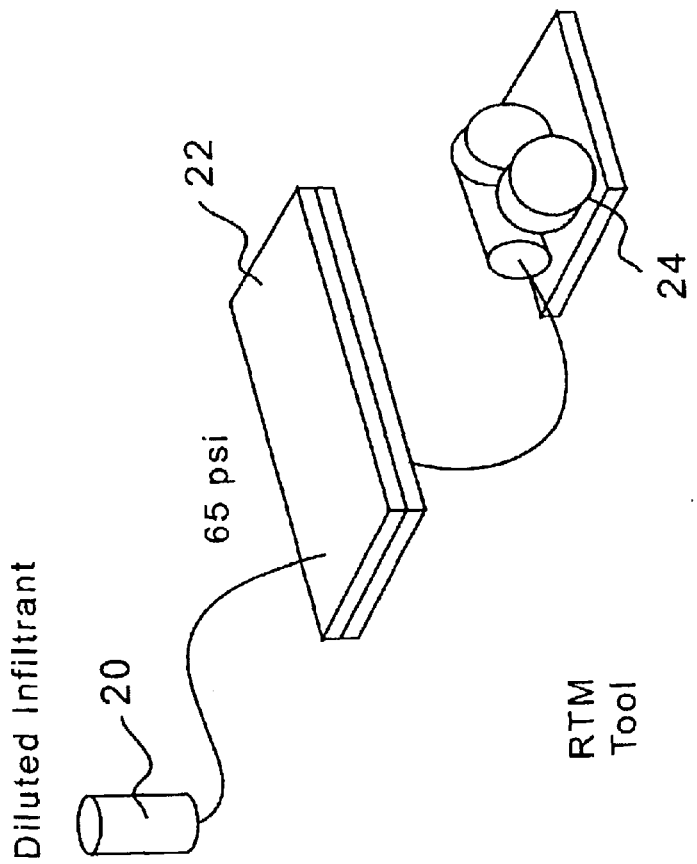

TPM Structure

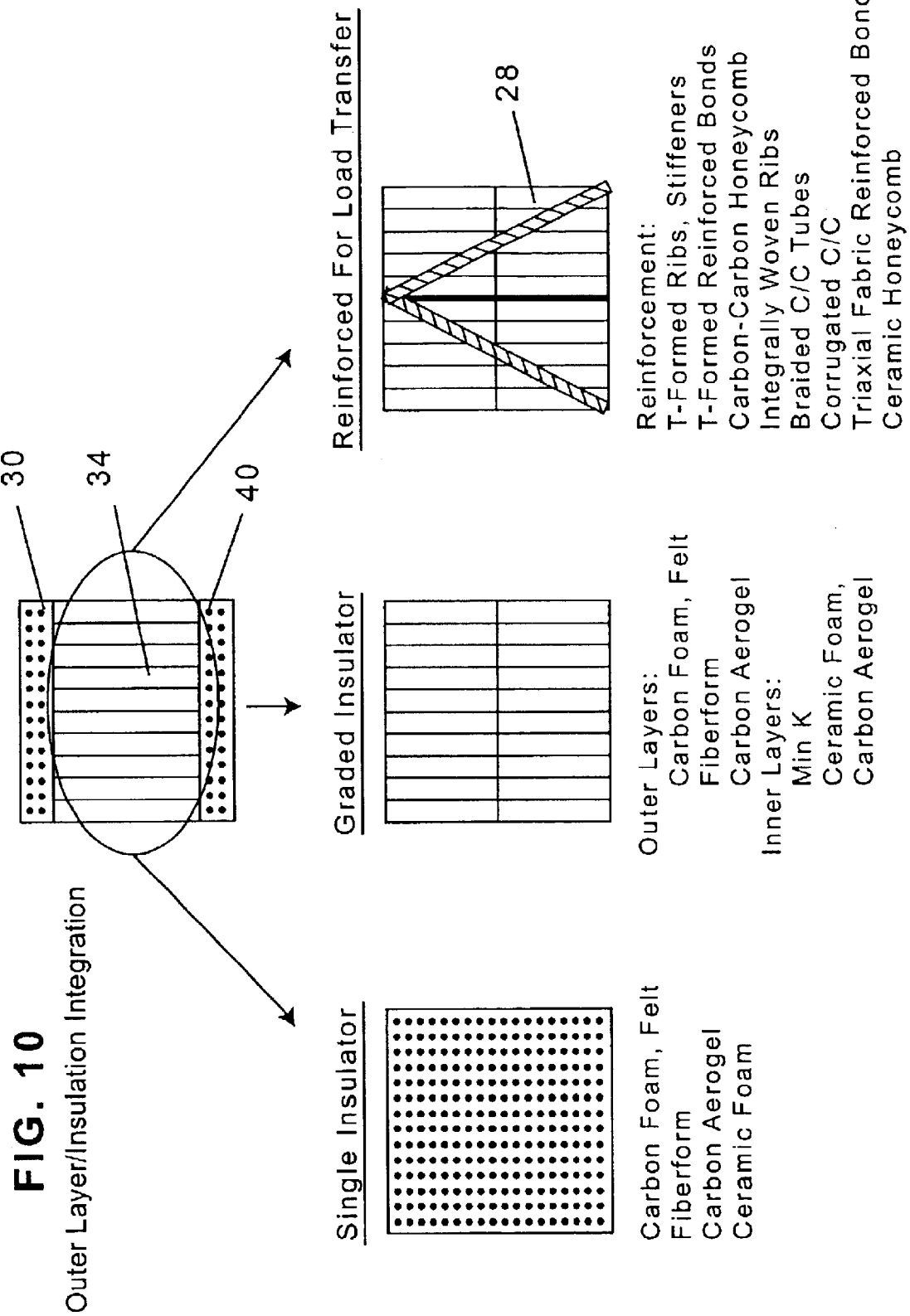

CARBON COMPOSITES WITH SILICON BASED RESIN TO INHIBIT OXIDATION

CROSS-REFERENCE TO RELATED APPLICATION

This application is a division of U.S. patent application Ser. No. 09/755,160 filed Jan. 10, 2001 now U.S. Pat. No. 6,555,211 entitled "Carbon Composites With Silicon Based Resin to Inhibit Oxidation".

FIELD OF THE INVENTION

This invention relates to thermal protective materials (TPMs) for the aerospace industry and more particularly, to a reinforced carbon composite material which has variable substrate density prior to impregnation, which is impregnated with a silicon based ablative resin which is cured and manufactured to form structural configurations which are useful for mounting on the exterior surface of a structure to be protected by the TPM and the method of making same.

BACKGROUND OF THE INVENTION

During reentry into the atmosphere, a vehicle is subjected to extreme thermal conditions. As the vehicle contacts the atmosphere at very high speeds, frictional forces release high levels of thermal energy which can raise the temperature to levels which are destructive to the outer shell. To protect the vehicle from high temperatures and wind shear, the vehicle's outer shell is typically covered with TPMs, which act as insulators and are designed to withstand these extreme thermal conditions.

Carbon-carbon (C—C) composites are one class of TPM which have been employed under such conditions with proven effectiveness. The success of a particular TPM requires that the system have sufficient mechanical strength at high temperatures, produce endothermic reactions upon decomposition, and have a high surface emissivity.

In its simplest form, a carbon-carbon composite is manufactured by combining carbon fibers with an organic resin, usually a high carbon yield epoxy or phenolic resin, and the resulting carbon fiber and resin matrix cured to achieve a three dimensional structure such as a tile, billet or other object. The matrix has a density, a void volume and a degree of mechanical strength.

The carbon fiber and resin matrix is then subjected to a high temperature treatment which decomposes the resin matrix to pure carbon, a process called charring or carbonization. Charring changes the resin coating from an organic resin to free carbon which coats the carbon fibers and partially fills the void spaces of the matrix with free carbon. The TPM may be subjected to several charring cycles, a process known as densification. The result of densification is to create a more rigid substrate, with a decreased void volume. The char surface of the substrate has a high temperature structural capability, which is a desirable characteristic.

Conventional C—C composites are manufactured in such a way so as to produce a highly filled and rigidized structure with a minimum of porosity. There are many ways for C—C materials to be densified including infiltration with petroleum pitch, impregnation with phenolic or other organic resins, or carbon vapor infiltration (CVI) using low molecular weight hydrocarbons such as methane. Any substance used for densification should have a high carbon char yield. Repeated cycles of impregnation and carbonization are required to first infuse the material with the carbon materials and then to heat them to a sufficiently high temperature (generally above 500° C.) to char the infiltrant and to create porosity for further densification cycles. A typical density range for a C—C composite with 5% porosity is approximately 1.6 to 1.8 g/cc, depending on the infiltrants and carbon fibers used in the composite.

The use of C—C composite TPMs on long duration, high altitude hypersonic reentry vehicles exhibit, however, some characteristics which can severely restrict mission performance. A major limitation of these materials is that they are subject to oxidation at extreme thermal conditions. The oxidation that these TPMs experience during long duration reentry can result in large shape changes to the vehicle aero-shell. Shape changes that adversely affect the mechanical strength and aerodynamics of the vehicle are unacceptable. To compensate for the loss of mechanical or structural integrity, which can lead to shape changes, typically the thickness of the material is increased. Increasing the thickness, however, adds unacceptably to the weight and volume of the vehicle, thus reducing the payload capacity and increasing cost.

While the C—C class of TPMs make them good candidates for aerospace applications due to their excellent high temperature structural properties oxidation shape changes can still be a problem. To address this, extensive efforts have been expended on oxidation resistant coatings for C—C composites with, however, limited success. The coatings developed to date are restricted to temperature levels generally below those experienced during reentry into the atmosphere, or in other high temperature applications. Also, coating costs and durability (durability in the form of handling microcracking, the occurrence of pinholes, particle impacts and damage from ground handling) are serious issues when one is considering coatings for use on C—C composite TPMs.

Ablation technology employs several mechanisms to manage the high levels of thermal energy released during reentry. Three of these are the vaporization and decomposition (pyrolysis) of the resin and subsequent transpirational cooling at the boundary layer. All of these processes absorb heat. Producing large amounts of gas is one measure of an ablation based system's ability to absorb heat. The production of gas can also be increased by impregnating the C—C substrate with an organic material specifically designed to vaporize and pyrolyze upon exposure of the system to high heat loads. Materials used in these passive transpiration systems, known as coolants, include materials such as polyethylene or epoxy, acrylic or phenolic resins.

Under such a system, there is created within the material a pyrolysis zone, where the resin and any supplemental coolants present are heated to temperatures where the organic materials decompose. The effect is the absorption of heat and the creation of additional carbon which can remain in the pyrolysis zone and/or be deposited on the carbon fibers and within the void volume of the substrate. Thus, the C—C ablator's final weight and ability to absorb heat are directly related to the amount of available resin in the C—C composite prior to reentry.

At the surface of the C—C ablator, heat is reradiated due to the refractive properties of the carbon substrate. In addition, the gasses produced in the pyrolysis zone within the C—C ablator are released to the surface at a relatively cool temperature when compared to the conditions at the surface. This effect, known as pyrolysis gas transpiration, provides cooling at the surface of the TPM. The disadvantages of the passive transpiration systems described herein include the high overall density of the material and the high internal pressure cause by the sudden buildup of gasses within the material. Ablation systems which can create and then release large volumes of gas thus exhibit a greater capacity to absorb and dissipate the heat of reentry.

In this regard, the structure of the C—C substrate is important to the overall effectiveness of the ablator. The void volume can be filled with a resin or other coolant to provide the raw material for production of gasses. In addition, methods of construction of the substrate can allow for greater transpiration pathways for release of the gasses. Systems which generate large volumes of gas over a short period of time also generate high internal pressures. Such pressure causes internal cracking in the substrate (microcracks) and also spalling at the surface. These effects are destructive to the mechanical integrity of the system and can lead to system failure. Therefore, improved transpiration pathways also protect the system from the effects of this internal pressure.

U.S. Pat. No. 5,635,300 to Kostikov, et. al., describes an advancement in the art of C—C or ceramic ablators through the introduction of silicon based resins to the C—C substrate. Upon decomposition and subsequent exposure to the very high temperatures at the surface, the silicon resin reacts with the carbon substrate to form a silicon carbide (SiC) coating on those fibers experiencing the high temperature conditions. The formation of SiC is more resistasnt to oxidation than carbon, and thus acts to strengthen the carbon substrate by forming a SiC skeleton in the areas of extreme temperature. When prolonged conditions of high temperature and wind shear at the surface lead to loss of SiC, the newly exposed carbon substrate undergoes further reaction to form new SiC, thus regenerating the protective skeleton.

The SiC layer which forms over the fibers of the carbon substrate in the interior of the ablator has a different coefficient of thermal expansion (CTE) than the carbon itself. The result is that when the system is subjected to temperature changes, the SiC coating within the carbon substrate forms microcracks. These cracks form passageways for the entry of air, which leads to oxidation of the carbon substrate, with resultant loss of strength and integrity of the ablator.

In Kostikov, a carbon-SiC substrate is created by obtaining a carbon-plastic preform composed of carbon fibers and a thermosetting resin binder and heat treating to form a coke matrix reinforced by carbon fibers. The coke matrix is densified by infiltrating with pyrolytic carbon and heat treating the preform at 1900 to 2000 deg. C. According to this invention, pore channels are formed following crystallization of the carbon deposited upon the matrix. Densification is followed by treatment with silicon which forms a SiC skeleton in the pore spaces of the composite. The carbon fibers can be in the form of a woven fabric or woven substrate.

U.S. Pat. No. 5,672,389 to Tran, et. al., discloses a low density ceramic ablator which employs a fibrous ceramic substrate which has, prior to impregnation with a resin matrix, a density of about 0.15 to 0.2 g/cc. Tran includes carbon fibers within a definition of the term ceramic. The ceramic substrate is impregnated with a low viscosity solution containing of an organic resin in a solvent. The excess infiltrant is removed, followed by removal of the solvent under vacuum, leaving resin-coated fibers, and a substrate having an average density of from 0.15 to 0.4 g/cc. Tran discloses that the resulting ablator may have either a uniform distribution of resin on the ceramic fibers, or a non-uniform distribution. The non-uniform distribution has the benefit of achieving the necessary degree of ablation at the outer surface, while being lightweight at the inner surface, where extreme temperatures are not experienced.

In addition, at the oxidizing conditions at the surface, silicon reacts with atmospheric oxygen to form a coating of silicon oxide ($SiO_2$), which manifests itself as a glassy layer on the outer surface of the ablator. This $SiO_2$ plus free carbon and free SiC mixture has a high surface emissivity which improves the ability of the material to radiate heat from the surface due to convection and re-radiation from the carbon substrate.

U.S. Pat. No. 5,965,266 to Goujard, et. al. discloses a carbon-SiC (C—SiC) composite TPM which has a self-healing mechanism for in-situ repair of the C—SiC matrix. The matrix is heat treated to form SiC and boron carbide (BC) over the C—SiC matrix. The SiC layer improves the mechanical strength of the system. However, due to the difference in CTE, the matrix experiences destructive cracking when exposed to the temperature changes experienced during reentry. These cracks create pathways that allow the entry of air, which causes oxidation of the C—SiC matrix, thus mechanically weakening the structure of the TPM.

The invention of Goujard provides available free silicon and boron as glass precursors which react with the exposed carbon under the high temperatures and oxidizing conditions of reentry. The glass precursors to form a self healing glass layer within the cracks, closing the pathway for internal oxidation of the substrate.

In addition to the strength and density of an ablation system, the manner in which the material is mounted onto the aero-shell, and the incorporation of additional layers of insulation also have bearing of the success of the TPM. U.S. Pat. No. 3,152,548 to Schwartz discloses a system whereby a series of coiled wires are attached to the aero-shell and the ceramic TPM is mounted onto the metal coils, thus creating a space between the aero-shell and the ceramic TPM. This space is filled with a pliable thermal insulating material, thus providing added insulation protection to the aero-shell. The patent discloses that the use of coiled wire compensates for differences in thermal expansion between the metal aero-shell and the ceramic insulator.

SUMMARY OF THE INVENTION

It is therefore a principal object of the invention to provide a thermal protection material (TPM) which is a carbon-carbon (C—C) ablator, and which is of relatively low cost, low density, high mechanical strength, and which offers a high degree of protection from oxidation. The present invention allows the TPM to be manufactured in a manner in which the variables of strength, weight and heat absorption can be varied across the thickness or the length of the TPM so as to achieve an optimal balance of these variables at the lowest attainable cost. The C—C ablator of the present invention also provides a structure with passageways, which allow for improved rates of transpiration of gasses produced. The C—C ablative TPM of this invention also includes methods of construction which allow for new and useful configurations of the C—C ablative TPM so that insulation material may be incorporated between the TPM and the vehicle aero-shell.

The C—C substrate of the present invention is a three dimensional object which can be woven or non-woven. The density of the fibers increases across the thickness of the TPM, thus increasing the strength of the substrate in that direction. Fiber density can be varied by varying either the weaving method or the type of fabric used (i.e. woven, non-woven, knitted or braided fabrics). In addition, the invention may include needling of the fabric, which increases the interconnection of the fibers across the structure's thickness (the z direction). Needling also serves to increase the porosity in the z direction, thus providing improved pathways for the transpiration of ablation gasses produced under high temperature conditions, such as during reentry. Improved weaving methods which can create three-dimensional structures may also be employed to vary fiber density in the z direction, and to increase transpiration rates of the ablator.

The C—C ablator of this invention is impregnated with an organic resin having a high carbon yield, and the resulting matrix is cured. The resulting coated substrate is subjected to one or more charring cycles to densify the substrate. After the charring cycles, the system is treated with a silicon based ablative resin and cured.

Inherent in this invention is the use of a silicon based ablative resin. Silicon based resin is available below the surface of the composite, and when heated, flows to the surface to react with carbon to produce SiC. Thus, while the ablative resin serves as a coolant to the system, the chemical reactions which occur at high temperatures within the ablator also serve to provide mechanical strength to the C—C substrate by creating an oxidation resistant SiC coating.

During reentry, the high temperatures are sufficient to oxidize the carbon substrate. This leads to recession of the surface of the ablator, resulting in a loss of mechanical strength and, consequently, changes to the shape of the vehicle surface. These shape changes can negatively affect the aerodynamics of the vehicle, which is unacceptable. The high temperature of the system during reentry creates SiC from a reaction of the silicon with the carbon of the substrate. During reentry, then, part of the char layer is oxidized. As this occurs, carbon is replaced by SiC, which provides a protective coating which resists oxidation. Furthermore, as recession proceeds at the surface of the ablator, the exposed carbon substrate further reacts with the silicon to form a layer of silicon carbide at the affected area.

In addition, at high temperatures, the silicon in the gasses produced by the pyrolysis of the resin react with the oxygen in the atmosphere at the ablator's surface to produce silicon dioxide ($SiO_2$), along with a mixture of free carbon and SiC. This mixture can be highly transmissive. With further oxidation, the concentration of $SiO2$ increases at the surface, providing oxidation protection to the subsurface carbon and SiC.

Another aspect of this invention is that the formation of SiC does not occur until the system is subjected to the high temperatures of reentry. This feature of creating the SiC matrix in-situ avoids the destructive effects of microcracking which occurs when a C—C substrate and SiC matrix is subjected to high temperature changes and/or mechanical stresses.

What has been developed is a unique approach to forming a low cost C—C composite with an in-situ method for providing durable oxidation protection. Not only is this a lower cost approach, but it offers improved ablation resistance compared with the conventional C—C composites used to date. A lower density C—C (1.3 to 1.5 g/cc) is used. This results in significant cost savings due to fewer numbers of densification cycles required. This material is infiltrated with a silicon based ablative resin (such as an RTV, manufactured by General Electric Corp.) using a resin transfer molding process (RTM).

The RTM process involves evacuating the sample of air in a closed mold and pressure impregnating the sample with RTV to fill in the available pores of the substrate. Since the invention requires that RTV materials are stored within the substrate, to be available for protection during reentry heating, provisions for this storage area are provided in the form of increased void volume. Furthermore, the C—C substrate must be designed and fabricated so that this storage volume and distribution is predictable. This is important to control the amount of RTV since too much RTV can create high internal gas pressure during high temperature exposure. Not enough RTV results in a loss of the protective effects of the ablative system during the reentry phase of flight.

Other embodiments of the invention include a C—C substrate which is created by a three dimensional weaving process known as multilayer interlock braiding. This weaving method can be used to produce a three dimensional carbon fiber substrate with the desired gradation in fiber density in a direction. The three dimensional woven object has great strength in the z direction and avoids the problems experienced with two dimensional fabrics which can have less integrity and interconnection across the layers of the composition.

Multilayer interlock braiding is a technique which allows for an interconnected three braid which can be formed into a three-dimensional form. The technique can attain a 3-D structure with variation in fiber density in the z direction. The resulting 3-D substrate has increased strength in the z-direction and allows for improved pathways for gas transpiration in the z-direction. The resulting substrate can be needled for additional interconnection and transpiration pathways. Multilayer interlock braiding is described in an article entitled 3-D Braided Composites, Design and Applications, Brookstein, D. (Albany International Research Co., Sixth European Conference on Composite Materials, September, 1993), the disclosure of which is incorporated herein by reference.

An additional advantage of the current invention, not achievable by any compositions in the art, is the ability to control not only the density versus the strength of the substrate, but also the amount of ablative resin available to be pyrolyzed and therefore available as coolant. The current invention has variable density and void volume across the thickness of the TPM. The areas with higher void volume contain greater amounts of RTV available for ablation during reentry. Therefore, the cooling capacity of the TPM varies depending upon the density of the C—C substrate. The external layers may contain a higher volume of coolant, while the interior layers can exhibit a higher mechanical strength.

To provide material systems that meet the above requirements for porosity and outgassing, several candidate manufacturing techniques are available. These include an open woven knit structure, since the loops inherent with the knitting process provide natural pockets of porosity available for RTV storage. Another concept is a woven structure with intentional spaces between adjacent yarns for creating the volume needed for RTV storage. Another concept is a multi-layer woven structure using a Jacquard type weaving machine. The weave architecture in such a structure can easily be tailored to provide volume for RTV storage. Another concept that offers the lowest cost option is a non-woven preform. Such a preform can be manufactured with preformed orientation in a layered construction. In addition, this concept as well as the other concepts mentioned can benefit from a needling process for added structural integrity.

There are a number of ways to incorporate outgassing paths for the structure. One way is to needle the preform prior to the C—C densification process. This process pierces the face of the woven preform in a regular or a tailored pattern or grid. This needling process causes a percentage of the fibers being pierced to align along the needling direction, creating a through thickness fiber component. This not only produces paths by which the gasses migrate out of the component, but the added through-thickness reinforcement increases interlaminar mechanical properties.

Another mechanism for providing through thickness gas paths is T-forming. T-forming is a method by which fibers are inserted directly into the preform. T-forming is disclosed in U.S. Pat. No. 6,103,337 assigned to Albany International Corp., Techniweave Division, entitled, Fiber Reinforced Structures and Method of Making Same, the disclosure of which is incorporated herein by reference. With this method, the T-forming spacing depth of penetration, and the orientation can be controlled. T-forming may also be a method selected for mechanically attaching the outer protection layer to the support elements to produce three-dimensional structural components.

By employing T-forming, the material concepts described can be tailored to the particular application requirements. The TPM can be manufactured in configurations which are structurally capable of withstanding the thermally induced structural loads and the aerodynamic loads of reentry and maneuvering. The material system can be designed to effectively transfer the loads while not act as a heat path from the aero-shell.

Another improvement of this invention involves the improved methods of attaching insulation material between the ablator and the vehicle's outer shell. The ablator, being made from a carbon fiber substrate, can be formed into advantageous configurations. These structural features can take the form of T-formed ribs and stiffeners, C—C honeycombs, integrally woven ribs, corrugated C—C and other advantageous forms. The space produced by installing the ablator in the form of a corrugated, T-joined or similar configuration is filled with an insulator material to add additional heat protection to the system.

Another embodiment of this invention is to fabricate a carbon fabric tape material with the silicon bearing RTV impregnated into the fabric surface. This material can then be laminated using heat and pressure to form a structural, fiber reinforced component with the silicon protection scheme already in place. This is a process that would require no C—C processing.

BRIEF DESCRIPTION OF THE DRAWINGS

Thus by the present invention its objects and advantages will be realized, the description of which should be taken in conjunction with the drawings, wherein:

FIG. 6 is a schematic depiction of the resin transfer molding (RTM) process;

FIG. 10 is a schematic view of several possible configurations of integrated TPM and insulation;

Figure 1:
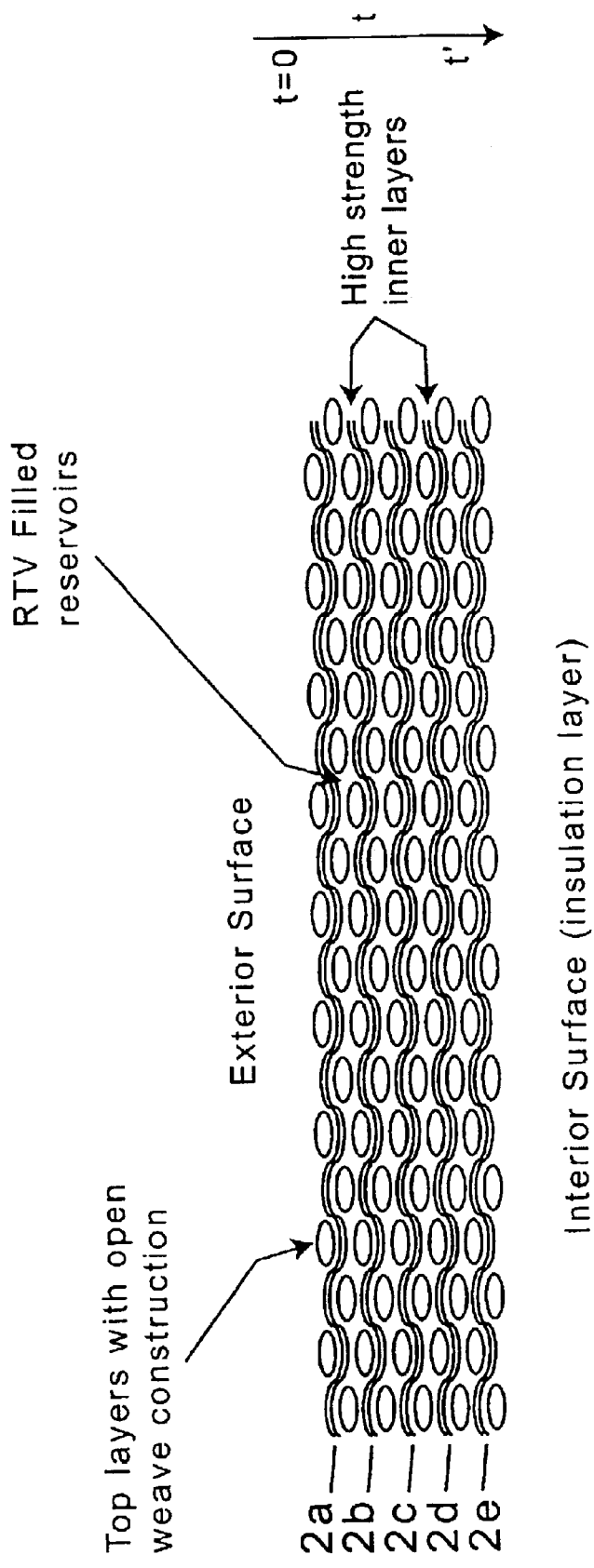
FIG. 1 is a cross sectional view of a carbon fiber structure composed of several woven layers which are laminated together.

DETAILED DESCRIPTION OF THE INVENTION VARIABLE DENSITY SUBSTRATE:

Turning now more particularly to the drawings, FIG. 1 shows a woven fiber substrate consisting of several layers of woven fabric which are laminated to form a structure. The fabric layers, $2a, b, c,$ to $2n$, of the structure are of variable density increasing from layer $2a$ to $2n$. The density of an individual layer $2$ can be varied by changing the type of weave, the tightness of the weave, etc. The effect is that the overall density of the structure increases in a direction indicated by t. The resulting composition is a three-dimensional object composed of woven fibers, having graduated density in a direction, t. The types of fiber which can be employed in the manufacture of the substrate of this invention includes carbon, PAN, graphite, silicon carbide or ceramic fibers.

At the exterior surface of the woven substrate of FIG. 1 (i.e. layer $2a$, $t=0$) the structure has a relatively low density and high relative void volume, indicating that there are fewer fibers per unit area relative to the overall structure. Alternatively, the interior surface of the substrate of FIG. 1 (i.e. layer $2n$, $t=t'$) has a higher relative density and a lower void volume indicating that there are more fibers per unit area relative to the overall structure. The effect of this composition is that the inner layers, which include layers $2n$-$1$ and $2n$, will be of higher strength, so that when the system is heated to high temperatures, the system will maintain its shape and mechanical integrity. At the same time, the external layers, which include layers $2a, b, c$, contain large void volumes filled with the silicon ablative resin (such as RTV resins available from General Electric Corp., for example) which will effect heat absorption through the ablation processes of vaporization, pyrolysis, surface gas blowing. The ablation process is thus concentrated at the outer layers of the TPM. The resins which are appropriate include, but are not limited to, RTV-11, 12, 31 or 615, all from General Electric Corp.

In addition to having a high capacity to contain a large volume of ablative resin, the outer layers also provide improved transpiration pathways, which allow the large volumes of gas produced to escape. The high volume of transpired gas provides increased heat absorbing capacity at the surface of the TPM, while relieving the internal pressure of the evolved gas, which minimizes mechanical stress and damage to the TPM substrate.

Figure 2:
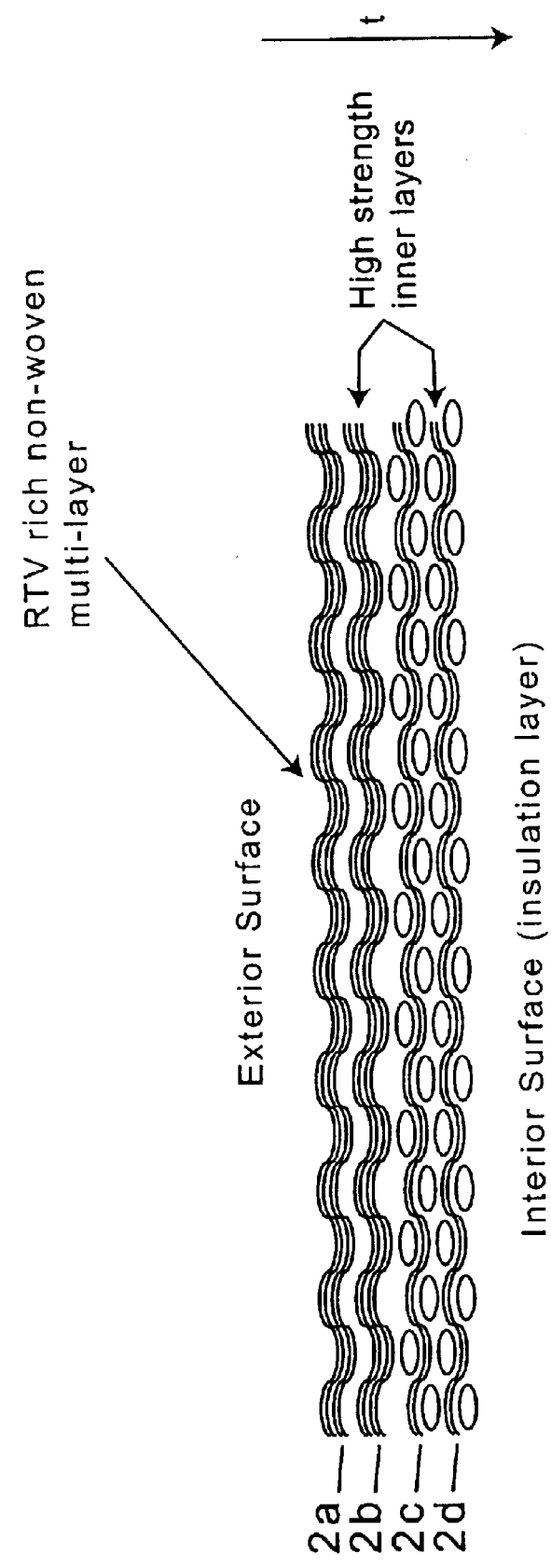
FIG. 2 is a cross sectional view of a structure composed of several layers of carbon fiber batt and several layers of woven carbon fiber fabric, said layers being laminated together.
Figure 3:
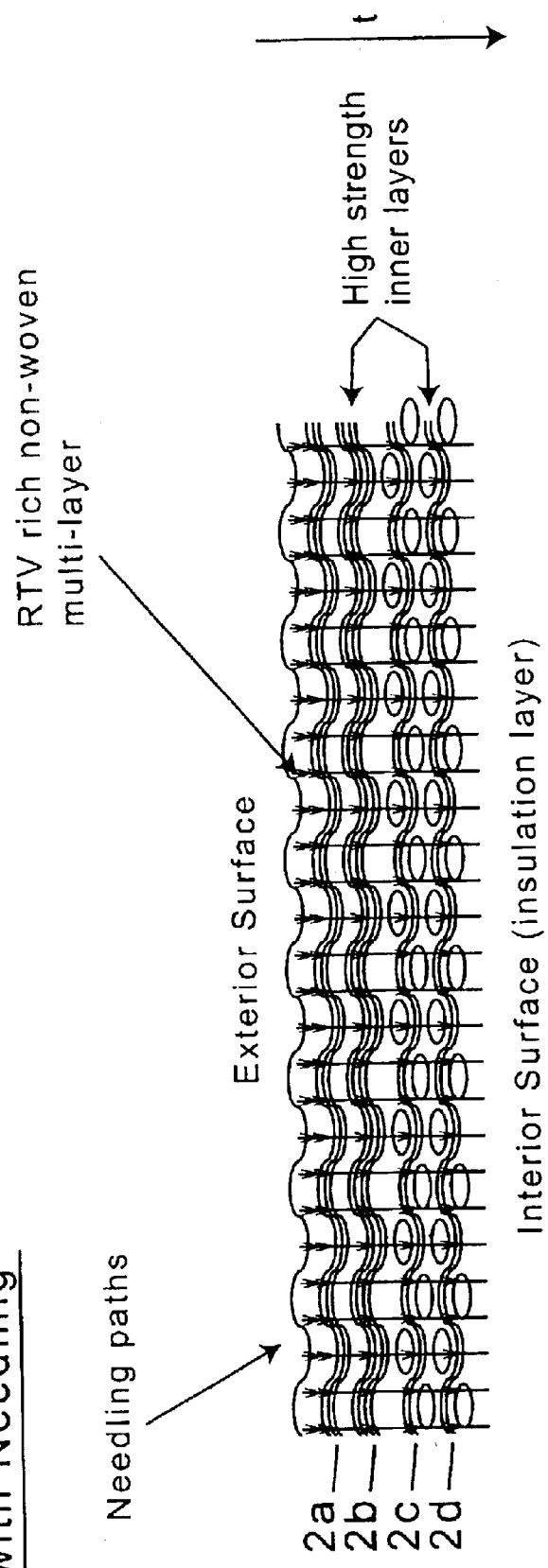
FIG. 3 is a cross sectional view of the structure of FIG. 2 which has been needled to increase communication of the layers across its thickness.

FIGS. 2 and 3 depict alternative structures which are included in the invention. FIG. 2 shows a combined woven and non-woven fiber substrate consisting of several layers of fabric which are laminated together to form a structure. The fabric layers, $2a, b, c,$ to $n$ of the structure are of variable density increasing from layer $2a$ to $2n$. The exterior layers, which include layers $2a, b, c,$ consist of a non-woven fiber batt material having a relatively low density and relatively high void volume. The interior layers, which include the layers up to and including layer 2n, are of relatively higher density and lower void volume. As in the above embodiment of FIG. 1, the inner layers are designed to maintain strength, while the outer layers are designed to perform the heat absorbing functions inherent in ablative TPMs.

FIG. 3 depicts the fiber substrate of FIG. 2, which has been further treated by needling. The staple fiber batt layers, the exterior layers (layers 2a, b, c) are needled together and to the woven fiber fabric layers at the interior (layers 2n-1, 2n) of the substrate. Needling has two advantageous effects on the TPM. First, the fibers of one layer are reoriented into the cross-plane direction, the z direction, thereby increasing the strength of the structure in the cross-plane direction. This added strength in the cross plane direction improves the integrity of the TPM during the extreme conditions of temperature and wind shear, such as during reentry. Second, needling serves to increase the porosity of the structure in the z direction, a characteristic which is beneficial to the ablative process because it allows for increased release and transpiration of the gasses produced by the ablator during reentry.

Figure 4:
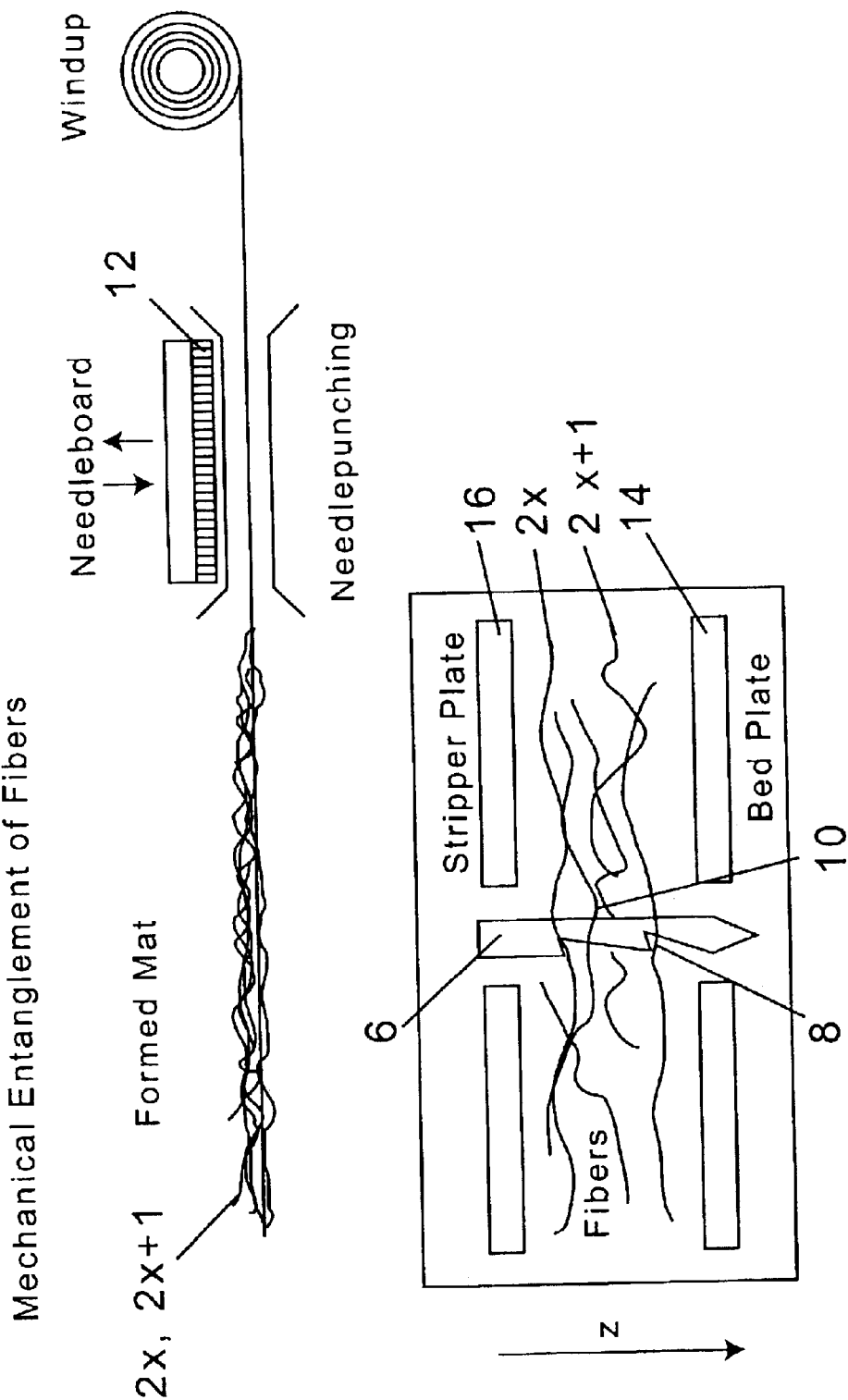
FIG. 4 is a schematic view of the needling process and effect of the needling process.

FIG. 4 depicts how needling increases the interconnectedness of the layers by driving individual fibers through and between the plane of the fabric layers. The needles 6 are contained in a needleboard 12, which contains a plurality of individual needles. As the several layers comprising the substrate are passed between the stripper plate 16 and bed plate 14, the needles are pushed though the layers. The needles have prongs 8 which catch individual fibers and force them into the cross-plane direction, the z direction, thus reorienting fibers across the plane. As the needle is withdrawn, the fiber is left in the z direction, and a puncture in the fabric approximately the size of the needle remains in that direction.

The effect of needling, as stated above, is to increase the strength of the laminated layers in the z direction, i.e. between the layers, thus giving added integrity to the three-dimensional substrate. In addition, the resulting holes become pathways for the release of gasses in the z direction. This increases the effectiveness of the ablation process of the TPM.

Figure 5:
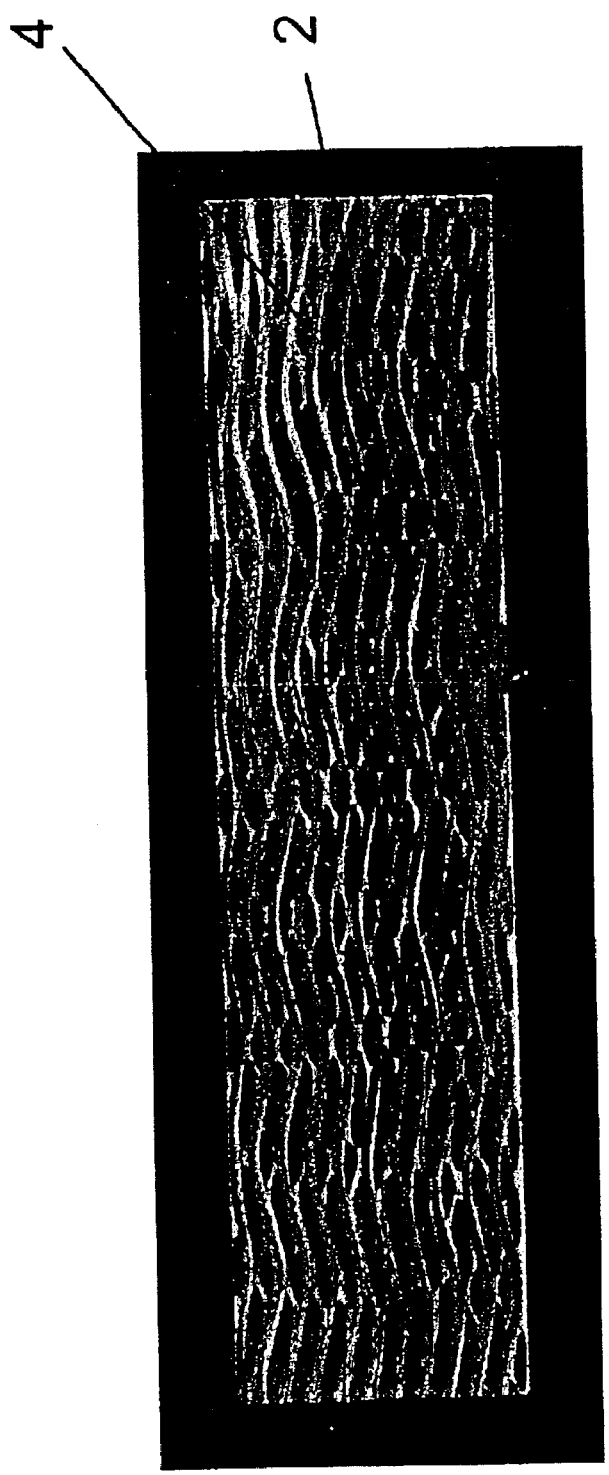
FIG. 5 shows a three-dimensional carbon fiber substrate showing the void spaces between the fibers.

FIG. 5 is a carbon fiber substrate similar to that depicted in FIG. 1 and shows the woven fibers 2, which run in the planar (x- and y-) directions. The pore spaces 4, are highlighted, and show up as lighter areas. The relative size of the pore spaces corresponds to the amount of void volume in the substrate which, in turn, is a measure of the amount of ablative resin which the substrate can contain. The greater the amount of resin the substrate contains, the greater the amount of gas the resin can produce, which in turn provides greater cooling to the ablator.

As the temperature of the TPM rises above the point where vaporization and pyrolysis occur, resin which is contained within the substrate vaporizes and creates internal pressure which must be released. Transpiration pathways are essential for relieving this destructive internal pressure. Furthermore, the gas must be released to the surface evenly so that the cooling effects of the gas are well distributed across the surface. The pathways which exist in the substrate to release gas, which is enhanced by the effects of needling, are therefore important aspects of the invention.

Another embodiment of this invention is to fabricate a carbon fabric tape material with the silicon bearing RTV impregnated into the fabric surface. This material can then be laminated using heat and pressure to form a structural fiber reinforced component with the silicon protection scheme already in place. This is a process that would require no C—C processing (i.e. charring and densification).

Another embodiment is manufactured using a three-dimensional braided weaving technique known as multi-layer interlock braiding. The advantages of this method are that the fibers are oriented not only in the planar x, y directions of a two-dimensional weave, but also in a third z direction which serves to give the structure greater interconnection and mechanical strength in the z direction. Variations in void volume and density can be achieved across the thickness, t, of the substrate by this method to a degree similar to the embodiment depicted in FIG. 1, above.

While the multilayer interlock braiding technique produces a structure with improved strength and integrity in the z direction, it also provides more uniform flow paths for the release and transpiration of the gasses produced in the ablation process during reentry. The improved capacity to release gasses is an advantage of this three-dimensionally woven embodiment of the invention. The structure's capacity to release and transpire gasses can also be increased by further needling the structure in the z direction. To this end, the structure may also be needled.

Impregnation, Carbonization and Densification of the Substrate

According to the preferred embodiment of the invention, the carbon fiber substrate is prepared as above and impregnated with a solution of a phenolic or epoxy resin having a high carbon yield and low ash value. The impregnation process employed is known as the resin transfer molding process (RTM).

There are several resin preparations which may be used in manufacturing C—C composites. They all have in common a high carbon yield. These include SC1008 phenolic resin manufactured by Monsanto. Also, as referenced in U.S. Pat. No. 5,536,562 there is Novolak epoxy based material available from Dow Chemical, and others.

This process, depicted in FIG. 6, involves taking either a virgin or partially densified C—C substrate and placing it in a RTM tool (or mold) 22 and evacuating the system of air by use of a vacuum pump 24. A resin preparation such as SC1008 or Novolak, as mentioned above, is placed in a feed container 20. Solvents, such as toluene, may be required with certain selected resins to achieve a desired viscosity.

The pressure is then raised at the feed container 20, to 55 psi (+/-15 psi) thereby pressure impregnating the C—C substrate with resin in a manner which insures full infiltration of the resin through all the void spaces of the substrate. The pressure is held beyond the working life of the resin.

Following impregnation, excess resin solution is allowed to drain off. Curing is accomplished either at ambient conditions, or at moderate temperatures, depending of the manufacturer's recommendations for a particular resin. The part is then removed from mold 22 and may be further cured at 150° C. or at room temperature for a reasonable period of time.

Upon removal of the solvent and curing, the carbon fibers of the substrate are left with a uniform coating of resin. The resin coating forms a carbon/resin matrix throughout the carbon fiber substrate.

The substrate is then heat treated to a temperature above 500° C. for a period from 2 to 24 hours, such period of time being sufficient to decompose the resin matrix to pure carbon. This charring process results in a rigidized carbon fiber substrate which is reinforced by a matrix of carbon. The resulting material is known as a carbon-carbon (C—C) substrate. The charring cycle may be repeated to achieve an average density of the C—C substrate of from 1.1 to 1.5 g/cc. However, the density of the substrate prior to final impregnation with the RTV, will be greater at the interior layers than at the exterior layers of the C—C substrate.

The rigidized C—C substrate is characterized by increased strength and density compared to the uncharred carbon fiber substrate. The charring cycle may be repeated to achieve the desired characteristics of strength, density and void. In addition to strength, the exterior char layer is a highly refractory surface characteristic of an insulator material. The preferred embodiment employs two charring cycles prior to impregnation with RTV.

Following charring, the C—C substrate is impregnated, using the RTM process, with a silicon-based ablative resin. The ablative resin has silicon as one of its major elements. The C—C substrate is impregnated using the RTM process, the excess resin is drained off and the impregnated substrate is cured to form a resin matrix which fills the void spaces of the C—C substrate up to 99%. Silicon based ablative resins suitable for use include several of the RTV-type resins available from General Electric and/or other manufacturers. In selecting an alternate silicon based ablative resin the silicon shall preferably not be in the form of silicon dioxide.

The RTV resins may include RTV-11, 12, 31 and 615, all from General Electric Corp. The viscosities of these resins range from 1,500 to 25,000 cps. With the higher viscosity RTV resins, they may be diluted with toluene to lower the viscosity to a level where the RTM process will work effectively. Curing times range from 2 hours to 7 days; and curing temperatures range from ambient to 150° C. Densities of these resins range from 1.00 g/cc to 1.42 g/cc.

Another embodiment of the invention does not utilize the initial resin impregnation and charring cycles prior to impregnation with the silicon based RTV resin. Rather, the carbon fiber substrate is RTM impregnated with the silicon ablative resin and cured, resulting in a carbon-fiber substrate which is rigidized by the application and curing of the silicon ablative resin. However, for all embodiments, the RTV resin is cured but not charred, so that there is no SiC or $SiO_2$ production prior to exposure to high heat loads of reentry.

T-Forming Techniques and Mounting of Insulation

The C—C composite ablators of this invention can be employed in the manufacture of new and useful structural configurations. The lightweight, strong and protective composites of this invention can be manufactured in such a manner and configuration so as to provide improved methods to incorporate insulation materials to the backface of the TPM.

Figure 7:
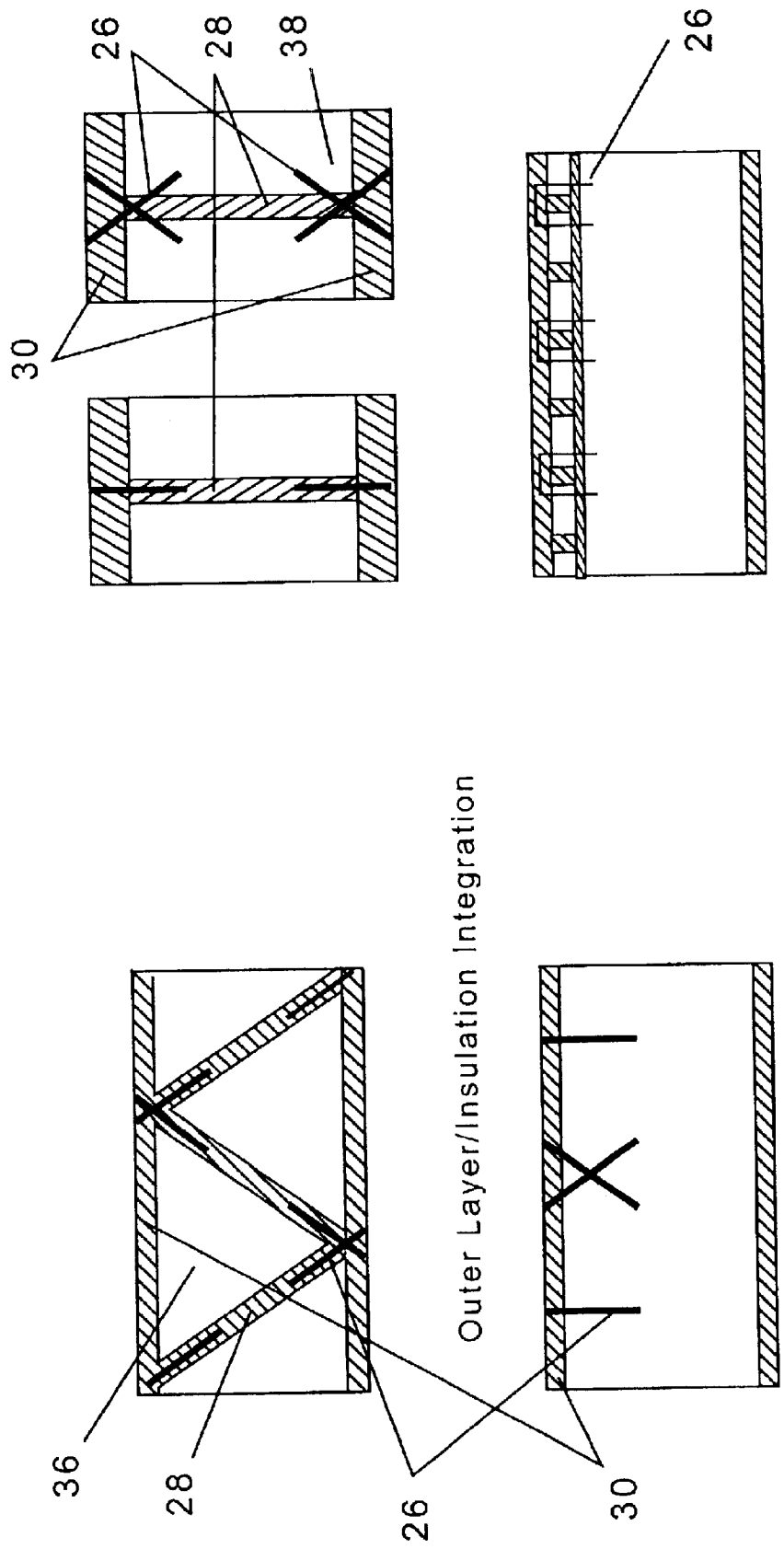
FIG. 7 is a schematic view of the several possible T-forming methods.

FIG. 7 depicts four methods of T-forming which can be used to achieve different configurations. In each depiction, individual carbon fibers 26 are inserted through the cross fiber surface of the substrate 30, and into the narrow edge of the support element 28. The result is an unimpregnated carbon composite preform 32 which can be in the shape of a T-joint 32 (FIG. 8), an I-Beam 38, or a corrugated preform 36. The result of T-forming is the creation of a reinforced preform structure wherein the reinforcement fibers 26 are impregnated with resin and become part of the final rigidized structure. In addition, the insertion of fibers 26 creates pathways for the release and transpiration of gas produced during ablation.

The manufacture of the various preform configurations can occur at different stages of production of the TPM. For instance, two carbon fiber structures may be joined in a T-form configuration prior to the initial impregnation and charring. This results in a structure that is uniformly rigidized and charred.

Figure 8:
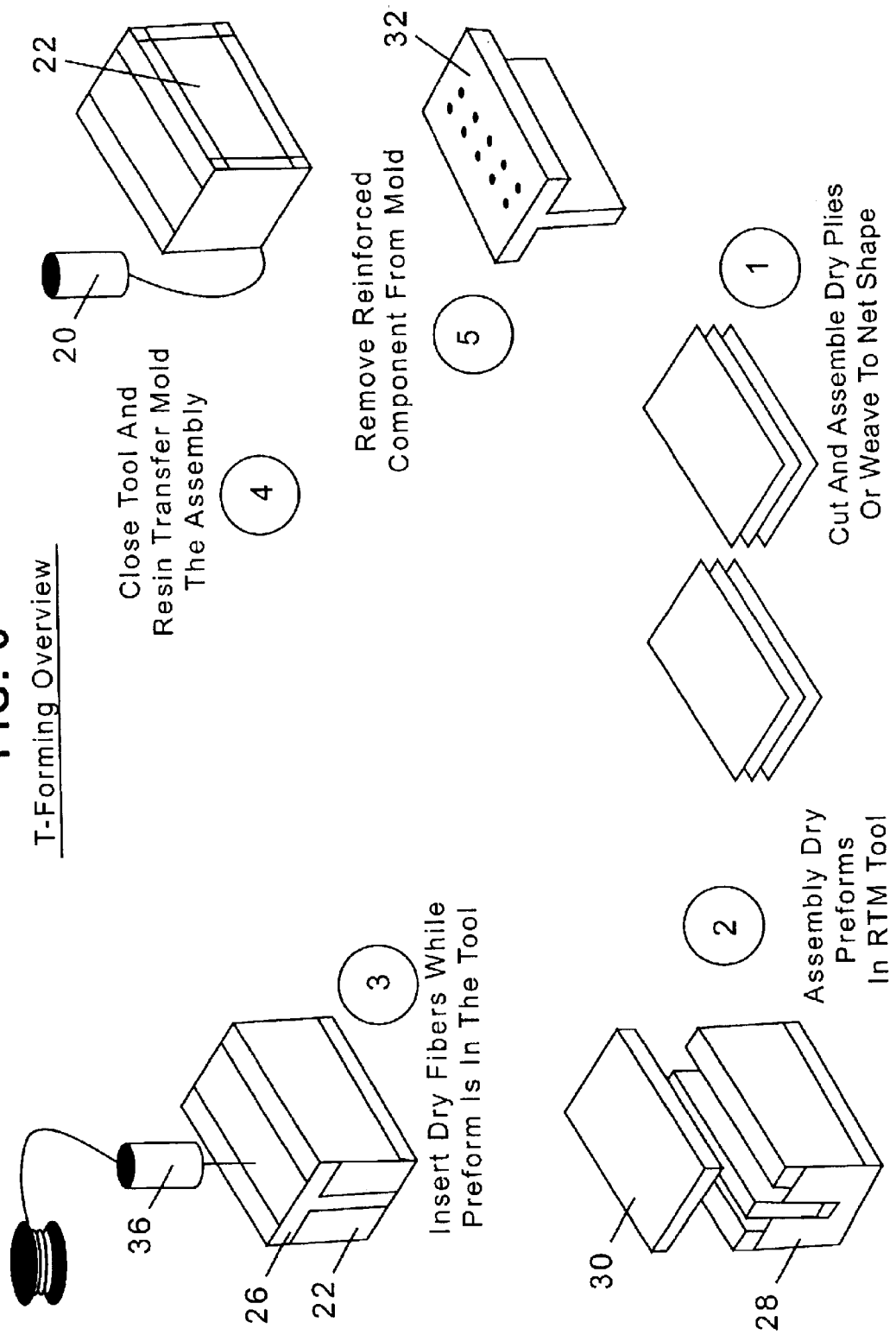
FIG. 8 depicts the combined T-forming and RTM processes.

FIG. 8, shows the T-forming method in combination with the RTM impregnation process. A reinforced preform is created by laminating layers of woven and/or non-woven fiber fabrics (or 3-D weaving a fiber substrate) to produce two component parts—a main substrate 30, and a support element 28. The support element 28 is placed in the RTM tool 22 and the main element 30 placed over the support element 28. The main element 30 is connected to the support element 28 by inserting single fibers 26 of material similar to the substrate using a stitching tool 36. The stitches are inserted in a direction which is parallel to the direction of fibers in the support element 28. As can be seen in FIG. 7, the stitches 26 may also be oriented at an angle to the support element.

After the two elements 28, 30 are connected by single fibers 26, the RTM tool 22 is sealed and evacuated of air by applying vacuum to the system. Resin solution is then fed into the RTM tool from resin reservoir 20 under pressure (approximately 55 psi, +/−15 psi).

Figure 9:
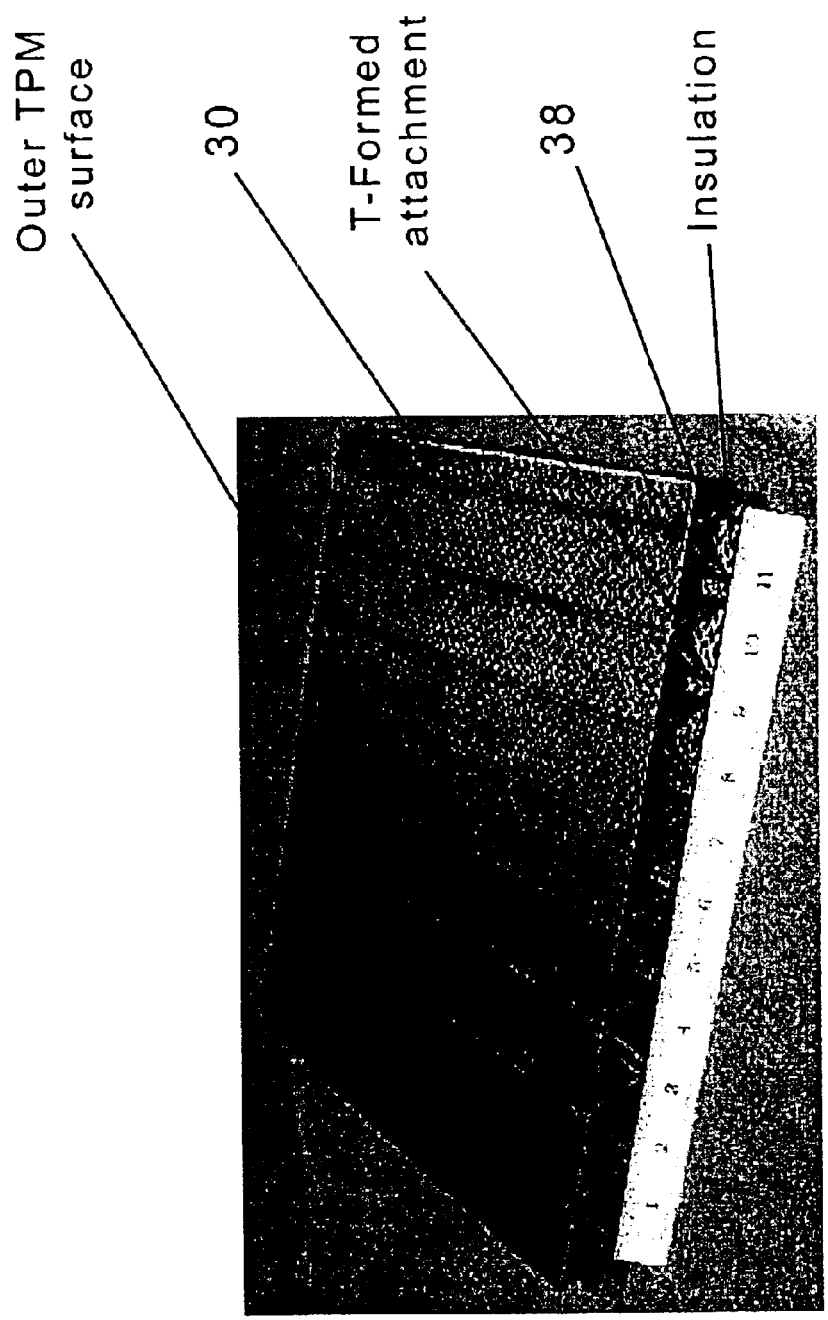
FIG. 9 is a perspective view of one embodiment of the invention showing a configuration which integrates the C—C composite ablator and insulation material.

FIG. 9 shows the preferred embodiment where the C—C composite ablator is incorporated with T-forming technology to produce a TPM structure which incorporates insulation and angled supports which are then attached to the aero-shell of the vehicle.

The preferred embodiment of this invention employs the T-forming method to attach support elements 38 consisting of a series of approximately right angles in such a manner that the angle corner is disposed against the backface of the TPM 30, forming two support elements which project from the backface of the TPM to the surface of the aero-shell at an angle of approximately 45 degrees relative to the backface. The support elements repeat in a manner similar to a corrugated structure, so that the point where two adjacent support elements meet at the aero-shell forms an approximate right angle, which faces the TPM backface. Insulation material is attached to the back face of the TPM and to the support elements to provide additional thermal protection to the vehicle.

Other embodiments are shown in FIG. 10, wherein the support element 28 is attached to the aero-shell 40, and the space created thereunder is filled with an insulation material 34. The insulation material can be of the following materials: Aerogel by Southern Research Inst.; Fiberfoam by Fiber Materials, Inc., or other suitable insulation material known in the art.

The C—C composite ablators of this invention provide for increased strength and oxidation resistance at a lower weight and cost compared with other C—C ablators available in the art. The characteristics of the invention include variable density and strength, together with the increased void volume and capacity to contain ablative resins and the improved ability to release the gasses produced by the ablative resins during reentry. Also, the system takes advantage of the strengthening, protective and repair mechanisms of a carbon-carbon and silicon ablation system, which acts to reduce the destructive effects of high heat and oxidation.

Although preferred embodiments have been disclosed and described in detail herein, their scope should not be limited thereby, rather their scope should be determined by that of their appended claims.

I claim:

1. A thermal protection system for protecting a surface subject to high thermal load, comprising: a fiber substrate having an external side and an opposite internal side wherein said external side faces away from the surface, and said internal side faces the surface, said substrate is needled in a direction perpendicular to the plane of the internal and external sides to increase the strength and the porosity of the substrate, and wherein said substrate has a variable density of fibers with said density of said fibers increasing in a direction going from the external side to the internal side.

2. The thermal protection system of claim 1, wherein said fibers are made of carbon, graphite, silicon carbide or ceramic.

3. The thermal protection system of claim 1, wherein said fiber substrate is composed of a plurality of layers of woven fabric.

4. The thermal protection system of claim 1, wherein said fiber substrate is composed of a plurality of layers of non-woven fabrics.

5. The thermal protection system of claim 1, wherein said fiber substrate is composed of plurality of layers of a combination of non-woven and woven fabrics.

6. The thermal protection system of claim 1, wherein said fiber substrate is formed by three-dimensional weaving process.

7. The thermal protection system of claim 1, wherein said fiber substrate is laminated together.

8. The thermal protection system of claim 1, wherein said substrate is impregnated with a silicon-based ablative resin.

9. The thermal protection system of claim 8, wherein said resin is room temperature vulcanizing resin.

10. The thermal protection system of claim 1, wherein said fiber substrate has an internal side and an external side which is disposed opposite to the internal side, and said fiber substrate is joined to a support element composed of fibers, wherein said support element has a first side, and a second side which is disposed opposite to the first side, wherein fibers of said support element are oriented in a direction which is parallel to the first and second sides, wherein the support element abuts internal side of substrate and the first and second sides of the support element are disposed at an angle between 0° and 180° to the substrate, said support element being joined to the substrate comprising the insertion of individual reinforcement fibers, said reinforcement fibers being inserted first through the external side of the substrate, then exiting the substrate through the internal side, then into the supporting element, in a direction parallel to the orientation of fibers in the supporting element.

11. The thermal protection system of claim 10, wherein said substrate is combined with insulation material attached to the internal side of said substrate.

* * * * *